United States Patent [19]
Birukawa et al.

[11] Patent Number: 5,247,495
[45] Date of Patent: Sep. 21, 1993

[54] OPTICAL MAGNETIC DISK WITH SEPARATE REGIONS PROVIDED ON IT

[75] Inventors: Masahiro Birukawa, Hirakata; Norio Miyatake, Kobe; Yasumori Hino, Neyagawa, all of Japan

[73] Assignee: Matsushita Electric Industrial Co., Ltd., Osaka, Japan

[21] Appl. No.: 657,819

[22] Filed: Feb. 20, 1991

[30] Foreign Application Priority Data

Feb. 21, 1990 [JP] Japan ................................. 2-39980

[51] Int. Cl.$^5$ .............................................. G11B 11/00
[52] U.S. Cl. ...................... 369/13; 369/272; 369/275.1; 369/275.2
[58] Field of Search ................. 369/13, 272, 274, 275, 369/275.1, 275.2, 275.3, 275.4; 428/621, 694

[56] References Cited

U.S. PATENT DOCUMENTS

| | | | |
|---|---|---|---|
| 4,985,881 | 1/1991 | Saito et al. | 369/13 |
| 5,020,040 | 5/1991 | Lee | 369/13 |
| 5,022,017 | 5/1991 | Jansen et al. | 369/13 |

Primary Examiner—Robert J. Pascal
Assistant Examiner—R. Ratliff
Attorney, Agent, or Firm—Wenderoth, Lind & Ponack

[57] ABSTRACT

A magneto-optical disc according to the present invention has separate regions located between mutually adjacent recording tracks. In the separate regions, magneto-optical signals are impossible to record or smaller than the recording tracks. Therefore, it is possible to maintain a low erasing power that is constant even when conditions such as off-tracking, defocusing and changes of operating temperature occur. The present invention provides a magneto-optical disc, further, which in a light modulating system restricts the recording domain so as to improve the number of times the disc can be rewritten, providing a magneto-optical disk that is highly compatible with different drives. Further, the magneto-optical disk according to the present invention is provided such that a residual signal is not caused if recording power during overwriting is lower than the previous recording power in a magnetic modulating system, further improving compatibility.

6 Claims, 7 Drawing Sheets

OPTICAL MAGNETIC DISK WITH SEPARATE REGIONS PROVIDED ON IT

BACKGROUND OF THE INVENTION

The present invention relates to a recording medium to be used for optical magnetic recording apparatus.

In recent years, optical magnetic discs are expected in many fields as low-priced, mass auxiliary recording apparatus as electronic computers are developed. The tracking system of optical beams in the optical magnetic discs is mainly divided into a continuous groove servo system and a sample servo system. Thus, the optical magnetic disc realizes the higher density recording and the random accessing.

Figure 2:
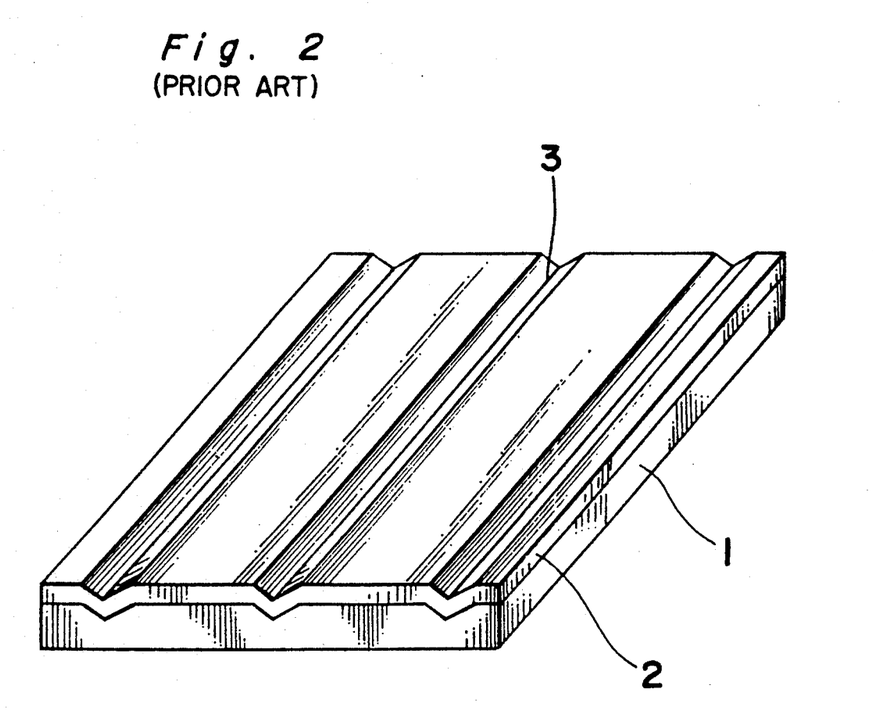
FIG. 2 is a perspective essential view of the conventional optical magnetic disc.

One embodiment of the conventional optical magnetic disc will be described hereinafter with reference to the drawings. FIG. 2 shows a partial enlarged optical magnetic disc. The optical beam for recording, reproducing use is positioned at the center between the groove and the groove with the groove on the optical magnetic disc being provided as a guide. When the optical magnetic disc is rotated by a motor or the like, the optical beams relatively move on the optical magnetic disc. A method of recording the data on the optical magnetic disc apparatus constructed as described hereinabove is mainly divided into the following two methods.

(a) Optical Modulating System

The data recording by the optical modulating system is composed of two processes of the previous data erasing and the new data storing. The temperature of the partial recording medium is raised to Curie temperature or higher by the application of the optical beams with the external magnetic field being added. When the optical beams move, the temperature raised portion of the recording medium is cooled by the radiation, and the magnetization of the recording film by the external magnetic field in this step becomes certain in direction. This is an erasing process. Inverse the external magnetic field and effect the pulse lighting of the optical beams in accordance with the storing data, and the magnetization of the portion where the temperature of the recording medium was raised to the Curie temperature or higher by the application of the optical beams become opposite in direction to the magnetization in the erasing process so as to record the data.

(b) Magnetic Field Modulating System

The magnetic field modulating system is to record the data by the modulation of the external magnetic field in accordance with the storing data with the temperature of the recording medium being made the Curie temperature or more by the continuous application of the optical beam.

But the construction as described hereinabove has the following problems.

(a) Problem in the Optical Modulating System

The optical magnetic disc is characterized in its exchangeable medium, with an important problem that the compatibility has to be retained among the respective drives. In order to retain the compatibility, it is necessary to set the optical beam application power at the erasing time, considering the off track, the defocusing among the respective drives, the environment temperature at the recording time, and so on. One example of the erasing power which is required to retain the compatibility in the conventional optical magnetic disc will be described hereinafter.

Figure 3:
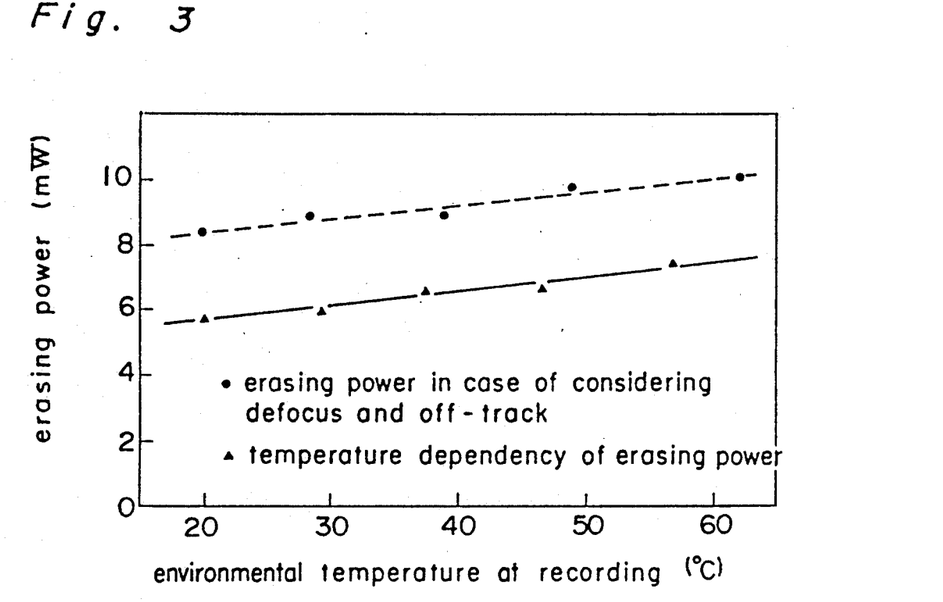
FIG. 3 is a graph showing the dependency of the erasing power in the conventional optical magnetic disc.

The optical beam application power (hereinafter referred to as erasing power) which is necessary to retain the erasing ratio 25 dB under the conditions of 20° C. in the optical magnetic signal stored at different temperatures is shown in solid lines of FIG. 3. As the width of the recoding domain is enlarged with the rise at the environment temperature at the storing time, the laser power necessary for erasing operation is also increased. The erasing power is required to be set at approximately 6.8 mW, considering the actual using environment and so on. When the off tracking and defocusing among the respective drives are also taken into consideration, the erasing power further increases as shown in the dotted lines of FIG. 3 so as to require approximate 10 mW. As described hereinabove, it is necessary to set the erasing power at 10 mW or more in the conventional optical magnetic disc, considering the compatibility among the respective drives.

Figure 4:
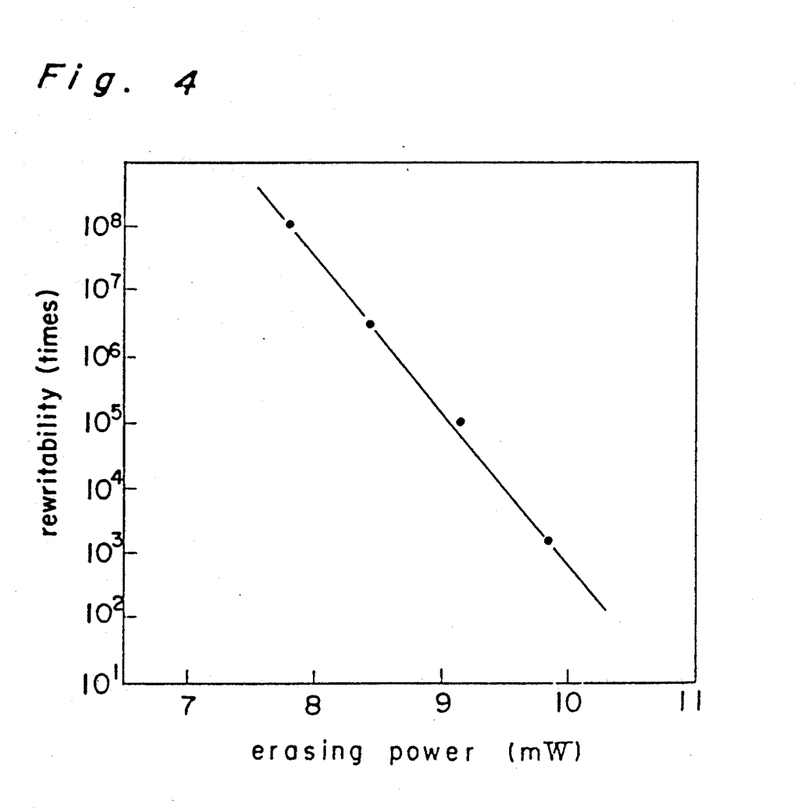
FIG. 4 is a graph showing the repetitive recording frequency dependency of the erasing power.

But when the erasing power is increased, the repetitive recordable frequency of the optical magnetic disc is lowered. FIG. 4 shows the relationship between the erasing power and the repetitive recording frequency. The repetitive recordable frequency is quickly lowered by the increase in the erasing power, with the repetitive recordable frequency becoming approximately $10^3$ times with the erasing power being at 10 mW.

When the erasing power is set, considering the compatibility among the respective drives in the conventional optical magnetic disc as described hereinabove, the repetitive recordable frequency retains approximately $10^3$ times only, thus making it difficult to be used as the auxiliary recording apparatus for the computer.

(b) Problem in the Magnetic Field Modulating System

Figure 5:
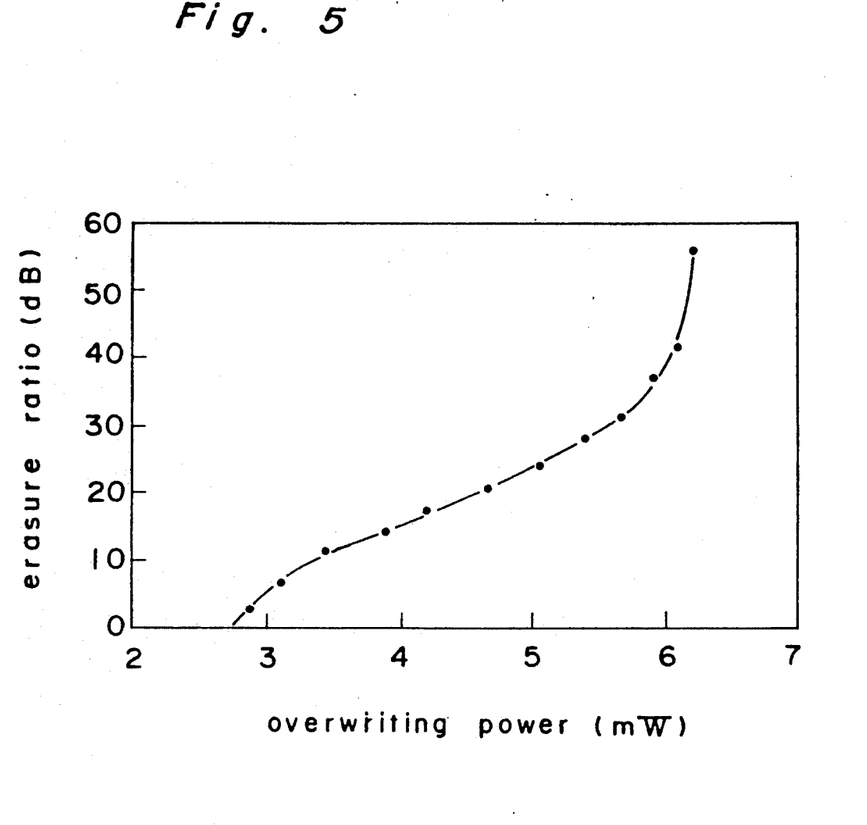
FIG. 5 is a graph showing the overlight power dependency of the erasing ratio in a case where the overlighting has been effected by the magnetic field modulating system on the conventional optical optical magnetic disc.

When the recording power is smaller at the overlight than the initial recorded power in the overlight of the data in the magnetic modulating system, the recording domain width at the overlight time becomes narrower than the initial recording domain width, thus remaining non-erased. FIG. 5 shows the relationship between the overlight power in the conventional optical magnetic disc and the erasing ratio which is the non-erased ratio of the previous signals. In the conventional optical magnetic disc, the range of the overlight recording power (hereinafter referred to as overlight power margin) which can retain the erasing ratio 25 dB of the previous signal is only approximately 10% in the recording power reducing direction. It is impossible to have comparability among the drives when the using environment, and the defocusing, the off tracking, the laser power setting error among the respective drives are considered.

SUMMARY OF THE INVENTION

Accordingly, the present invention has been developed with a view to substantially eliminating the above discussed drawbacks inherent into the prior art, and has for is essential object to provide an improved optical magnetic disc with separate regions being provided on it.

Another important object of the present invention is to provide an improved optical magnetic disc which is capable of setting the erasing power within a range where the repetitive recording frequency may be sufficiently retained even in the consideration of the comparability in the optical modulating system. Also, an optical magnetic disc which is much wider in the overlight power margin is provided in the magnetic field modulating system.

Figure 6:
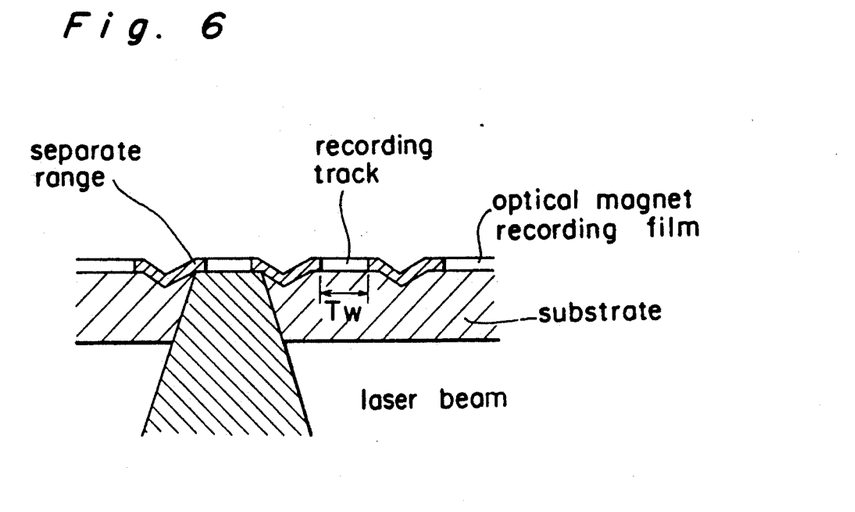
FIG. 6 is a sectional view of an optical magnetic disc of the present invention and the optical beams thereof.

In accomplishing these and other objects according to the preferred embodiment of the present invention. The optical magnetic disc of the present invention is composed of separate regions provided among the mutually adjacent recording tracks. The summary of the optical magnetic disc of the present invention will be described hereinafter with the use of FIG. 7. FIG. 6 shows one portion of the sectional view of the optical magnetic disc of the present invention and the record reproducing optical beams. The recording tracks of FIG. 6 show the regions capable of recording the optical magnetic signals, and the regions of 0.8 time or more and 1.5 time or less of the half value width on the optical medium of the optical beam used in the recording, reproducing, erasing in TW in width Tw thereof. The separate region is a region where the reproducing signal strength of the separate region becomes 0.7 time or less with respect to the reproduction signal strength of the recording track when the recording operation has been effected under the same conditions, with the optical beams being positioned at the respective centers of the recording track and the separate region.

In the optical magnetic disc of the above described construction, the contribution from the separate region with respect to the reproduction signal becomes extremely reduced. Thus, the erasing in the optical modulating system is sufficient at the recording track region only. Therefore, even when the domain width at the recording time has been increased, it becomes possible to considerably increase the repetitive recordable frequency without the necessity of increasing the erasing power.

Also, in the practical magnetic disc of the above described construction even in the magnetic field modulating system, the non-erased remains are reduced if the overlighting is effected with the power or more with the recording power being set larger than the power with which the storing operation may be effected fully through the recording track width in the recording domain of the optical magnetic signal. Therefore, it may be possible to have the overlight power margin wider than in the conventional optical magnetic disc.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
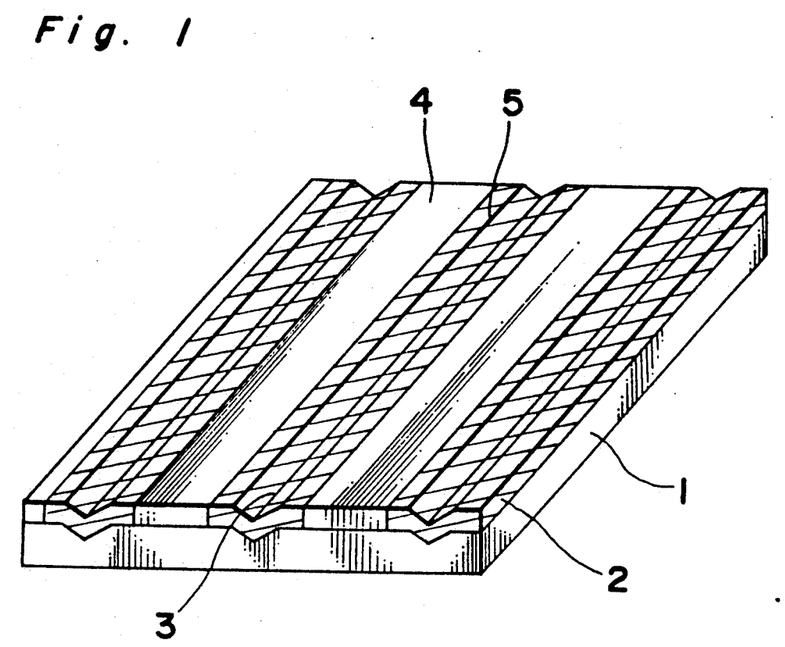
FIG. 1 is a perspective essential view of an optical magnetic disc in a first embodiment of the present invention.
Figure 7:
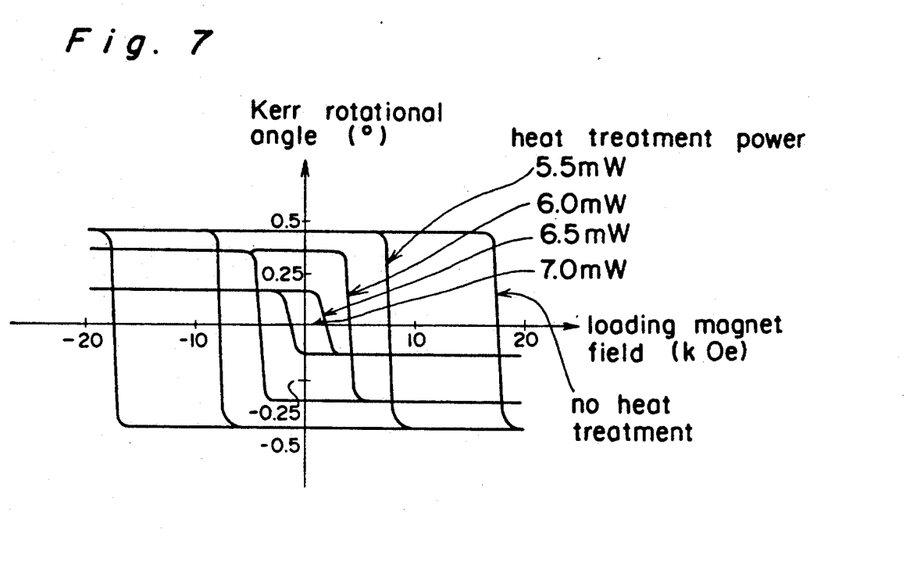
FIG. 7 shows changes in the car hysteresis loop of the optical magnetic recording film by the thermal treatment power.
Figure 8A:
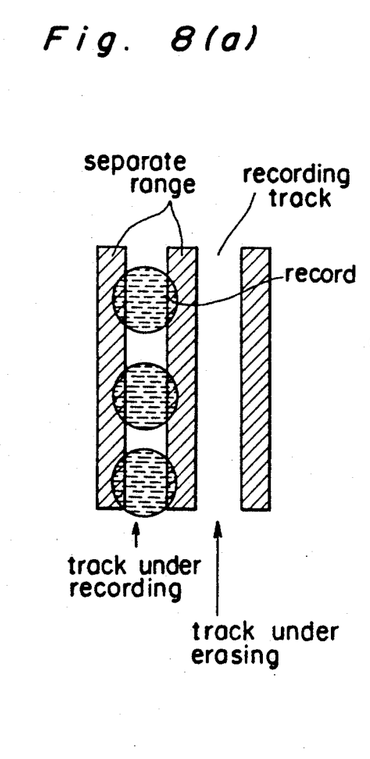
FIGS. 8a and 8b are views illustrating the effect of the separate region by the changes in the track width.
Figure 8B:
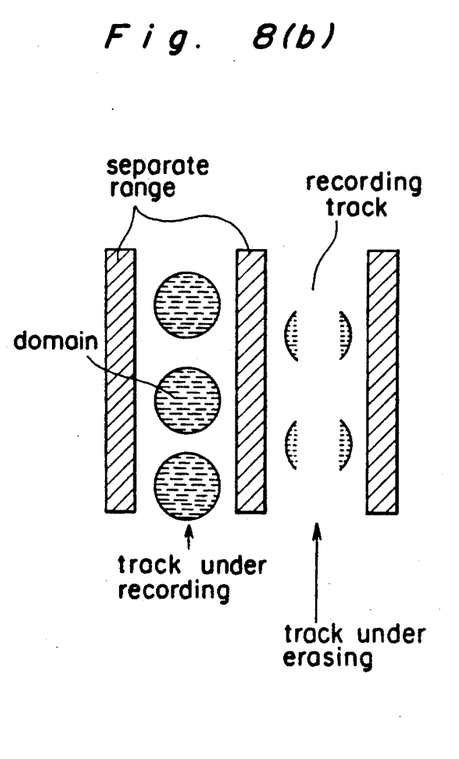

Referring now to the drawings, there is shown in FIG. 1, an optical magnetic disc according to one preferred embodiment of the present invention, which includes a basic plate 1, an optical magnetic recording medium 2, a groove to be used for tracking guide use 3, an optical magnetic signal recording region 4, a separate region 5. One example of the separate region forming method in FIG. 1 will be described hereinafter. The optical magnetic recording medium is reduced in the magnetic anisotropy energy in the vertical direction with respect to the recording face when the thermal treatment is effected with the laser. Therefore, the recording film in a region where the thermal treatment has been effected becomes a face internal magnetized film, thus resulting in a recording impossible region. FIG. 7 shows the relation between the external magnetic field of the optical magnetic recording medium where the width of approximately 3 mm being thermally treated while the laser light is being moved with the linear velocity at the thermal treatment time being secured at 1.5 m/s, and the car rotation angle by the vertical car effect. When the thermal treatment laser power is changed, the car rotation angle is gradually reduced at the thermal treatment laser power 6 mW or more, with the car rotation angle becoming zero at 7.0 mW. Namely, by the thermal treatment of the optical magnetic recording film, the region small in the magnetic optical effect or a region (where the recording cannot be effected) where the magnetic optical effect is not shown at all may be formed. Here the region where the magnetic optical effect is small means—1 μm in the unit of resolving power to be obtained by the reproducing beam.

Figure 9:
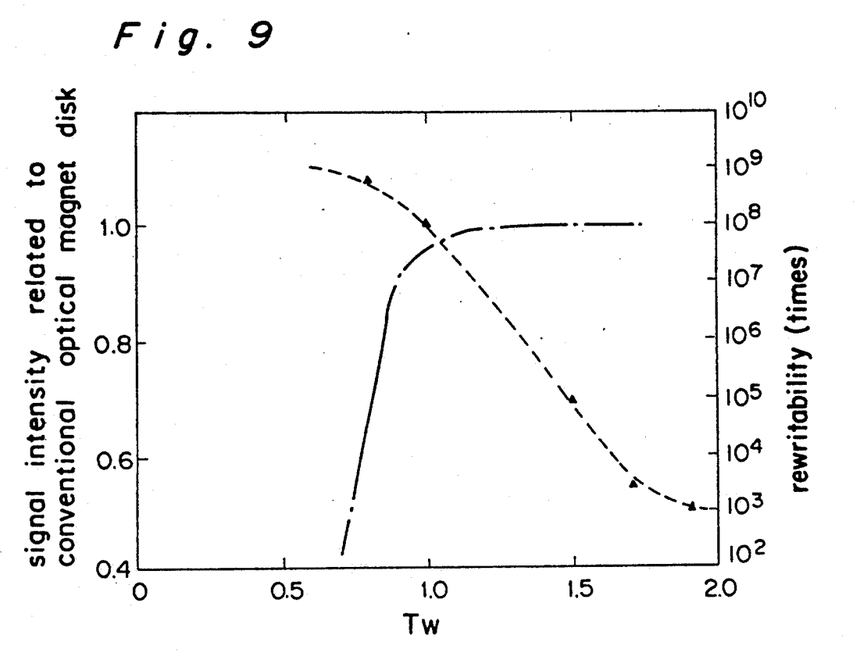
FIG. 9 is a relation graph between the relation between the recording track width and the signal strength and the repetable recording frequency.

The separate region plays a part of a guide band where the recording domain width is not widened by width of the recording track or more even when the recording conditions have been changed between the different optical magnetic disc drives. In this case, unless the width of the recording track is a value or lower with respect to the width of half a value of the optical beam, the separate region does not effect the effective function as the guide band (see FIG. 8 (a), (b)). On the other hand, the reproduction signal strength is lowered when the width of the recording track becomes lower somewhat in value with respect to the half value width of the optical beam. An optimum value with respect to the above described mutually opposite width track width becomes as follow. The repetitive recordable frequency in a case where the recording has been effected with the recording track width and the optical modulating system is shown in dotted liens of FIG. 9. Also, the relation between the reproduction signal strength and the track width in a case where the signals have been recorded on the recording track is shown in the solid lines of FIG. 13. As the axis of abscissa of FIG. 9 shows is relative to the optical beam half value in the recording signal strength change and the repetitive recordable frequency, the half value width of the optical beam is shown with an opposite value (hereinafter referred to as Tw) as 1. As clear from FIG. 13, the Tw is most effective at 0.8 or more and 1.5 or less where the reproduction signal strength change is less and the repetitive recordable frequency is improved.

Figure 10:
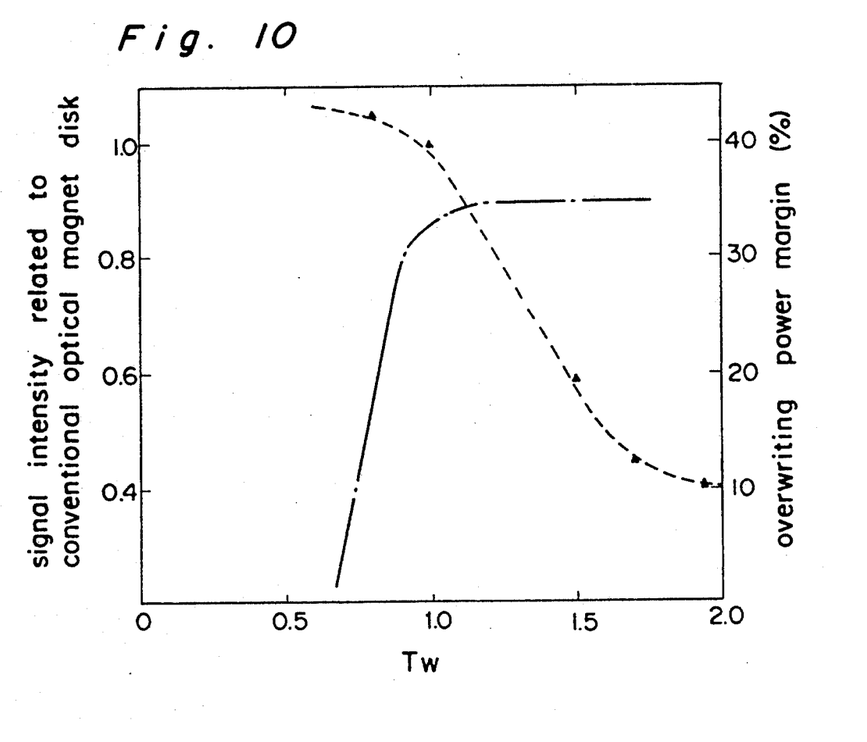
FIG. 10 is a relation graph between the relation between the recording track width and the signal strength and the overlight power margin.

Similarly, the relation between the signal strength change at the recording time by the magnetic modulating system and the Tw is shown with a solid line, and the relation between the overlight power margin and the Tw is shown with dotted lines in FIG. 10. The Tw=0.8 through 1.5 is most effective in a region where the overlight power margin is enlarged, and the signal strength change is less even in the magnetic modulating system as in the optical modulating system.

Figure 11:
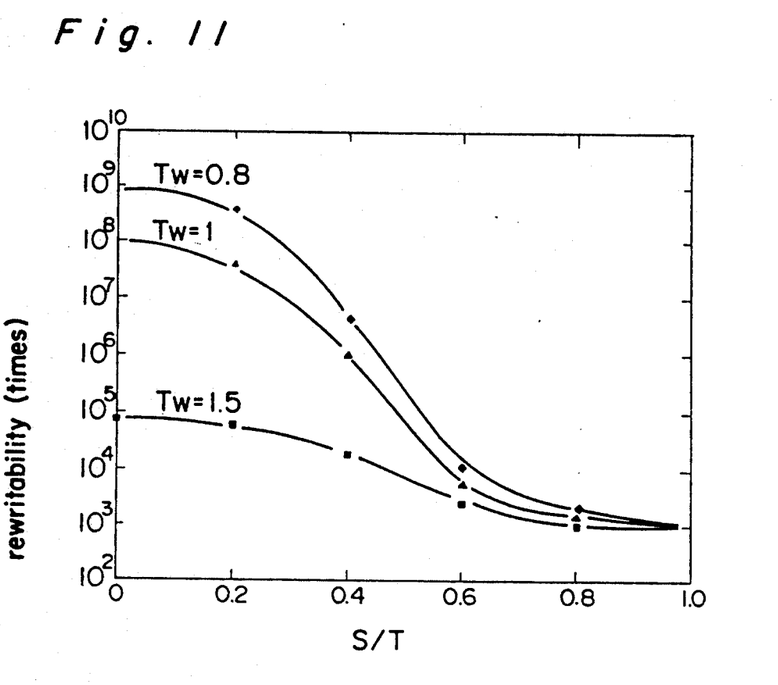
FIG. 11 is a relation graph between the reproducing signal strength and the repetitive recordable frequency in a case where the recording has been effected under the same conditions on the separate regions and the recording tracks.
Figure 12:
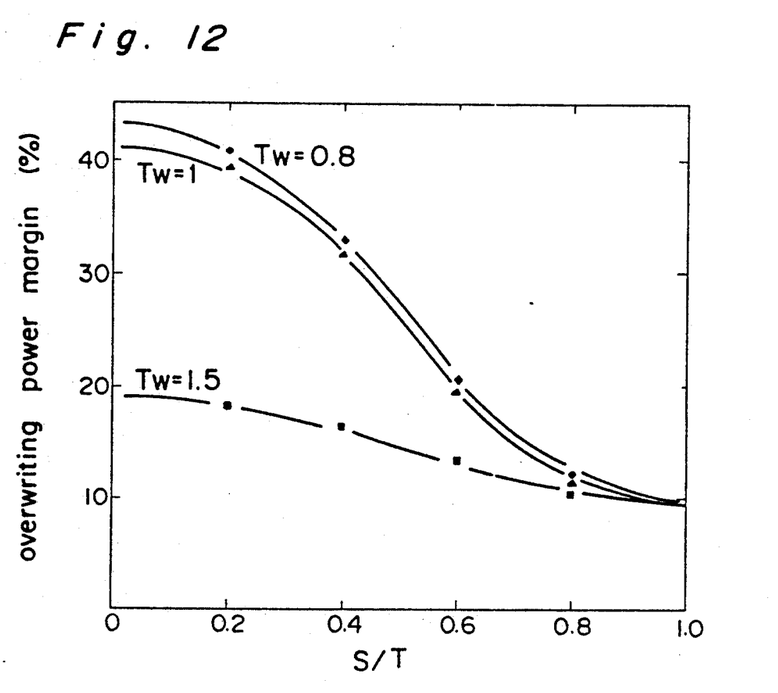
FIG. 12 is a relation graph between the reproducing signal strength and the overlight power margin in a case where the recoding operation has been effected under the same conditions on the separate regions and the recording tracks.

In order to make the effect of the optical magnetic disc of the present invention effective, the contribution with respect to the reproduction signal from the separate region must be lower by some extent. The contribution may be defined by the reproduction signal strength ratio (hereinafter referred to as S/T) in a case where the recording domain of length of three times or more of the width of half the value of the optical beam has been recorded under the same conditions with the optical beam being positioned in the center of the center of the recording track and the separate region. Here the recording track and the separate region include at center the error of approximately 0.3 time with respect to the half value width of the optical beam, depending upon the servo circuit for positioning the optical beam. FIG. 11 shows the relation in the repetitive recordable frequency in the S/T and the optical modulating system. The effect is shown in the improvement of the repetitive recordable frequency at 0.7 or lower at the S/T. Namely, 0.7 or lower in the S/T showing the contribution with respect to the reproduction signal from the separate region becomes the effective range in the optical magnetic disc of the present invention. Also, the relation between the S/T and the power margin in the magnetic field modulating system is shown in FIG. 12. The effect is shown in the increase in the power margin at S/T=0.7 or lower even in the magnetic field modulating system, so that 0.7 or lower at the S/T results in the effective range in the optical magnetic disc.

The separate region is required to be formed at the constant interval and under the uniform condition at both the ends of the recording track. As the optical disc of the present invention can guide the laser light for thermal treatment use by the use of the unevenness cut in the optical magnetic disc, the separate region which is at a certain interval and has the uniform may be easily formed.

Figure 13:
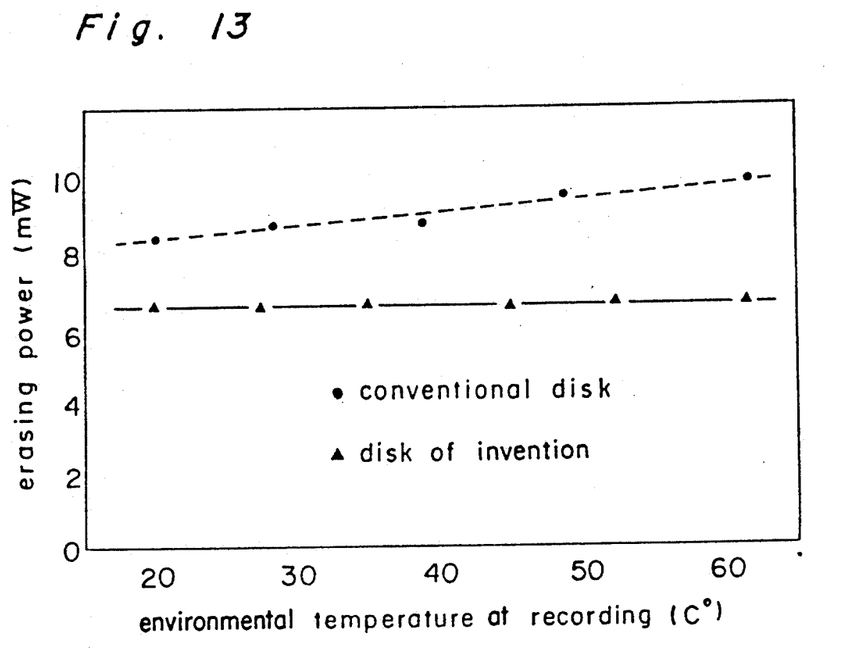
FIG. 13 is a relation graph between the temperature changes at the recording time and the erasing power considering the defocusing, the off tracking about the conventional disc and the disc of the present invention.

The effects in the optical modulation recording system and the magnetic field modulation recording system of the optical magnetic disc of the present invention in Tw=1, S/T=0.1 as one example of the optical magnetic disc of the present invention. FIG. 13 shows the erasing power which is capable of retaining the erasing ratio 25 dB if the off track, the defocusing are considered at 20° C. when the storing operation has been effected on the optical magnetic disc of the present invention and the conventional disc with the recording medium temperature at the recording time being changed at the recording time by the optical modulating system. The solid lines show optical magnetic disc of the present invention, and the dotted lines show the conventional disc. Even when there are temperature changes at the recording time, the off track, the defocusing, the erasing power is hardly changed in the optical magnetic disc of the present invention. Therefore, the repetitive recording frequency may be considerably improved from the conventional $10^3$ times from $10^8$ times.

Figure 14:
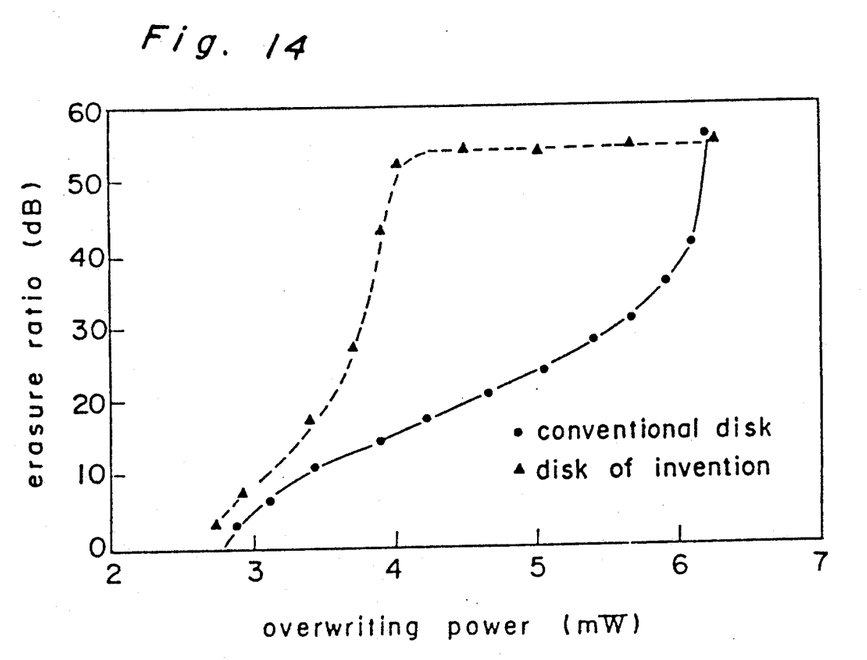
FIG. 14 is a relation graph between the overlight power and the erasing ratio in a case where the overlighting has been effected on the conventional optical magnetic disc and the optical magnetic disc of the present invention by the magnetic modulating system.

FIG. 14 shows the relation between the overlight power and the erasing ratio of the previous signal in a case where the optical magnetic disc of the present invention has been overlit by the magnetic field modulating system is shown in FIG. 14. As compared with the conventional disc, the overlight power margin is enlarged from 10% to 40% or more, thus making it possible to retain sufficient compatibility. When the off tracking, the defocusing, the temperature changes of the recording medium have been taken into consideration, the overlight power margin has been retained only by approximately 3% in the conventional optical magnetic disc. But in the optical magnetic disc of the present invention, the power margin of 35% can be retained.

The optical magnetic disc of the present invention is not required to increase the erasing power even when there are the off tracking, defocusing, the temperature changes in the recording medium and so on in the optical modulating system, may be retained constant with the low laser power, so that the optical magnetic disc which is better in the repetitive recording characteristics and is extremely higher in the compatibility. Also, the optical magnetic disc which is extremely wider in the power margin at the overlight time, and is higher in compatibility in the magnetic modulating system.

Although the present invention has been fully described by way of example with reference to the accompanying drawings, it is to be noted here that various changes and modifications will be apparent to those skilled in the art. Therefore, unless otherwise such chances and modifications depart from the scope of the present invention, they should be construed as included therein.

What is claimed is:

1. A magneto-optical disc, comprising:
    a substrate having magneto-optical film thereon so as to define a recording plane;
    tracking guides provided on said recording plane for guiding laser beams;
    recording tracks on said recording plane; and
    separate regions provided between adjacent said recording tracks;
    wherein said separate regions comprise portions of said magneto-optical film and said recording tracks comprise portions of said magneto-optical film, said magneto-optical film of said separate regions having magnetic properties irreversibly different from said magneto-optical film of said recording tracks such that said separate regions cannot be recorded.

2. The magneto-optical disc of claim 1, wherein said magnetic properties of said separate regions which are irreversibly different comprise the anistropy of said magneto-optical film thereof being irreversibly in-plane.

3. The magneto-optical disc of claim 2, wherein each said recording track is defined by a said separate region on each side thereof such that said recording tracks have a track width defined between said separate regions larger than 0.8 times and smaller than 1.5 times the full width of half maximum of a laser beam to be used on said magneto-optical disc in recording, reproducing and erasing.

4. The magneto-optical disc of claim 1, wherein each said recording track is defined by a said separate region on each side thereof such that said recording tracks have a track width defined between said separate regions larger than 0.8 times and smaller than 1.5 times the full width of half maximum of a laser beam to be used on said magneto-optical disc in recording, reproducing and erasing.

5. The magneto-optical disc of claim 1, wherein:
    said magnetic properties of said separate regions which are irreversibly different are created by irradiating said magneto-optical film with light beams having a power greater than the power necessary for recording and erasing information; and
    wherein $I_S < 0.7\ I_T$ when recording and reproduction are conducted under the same conditions except for the scanning position of light beams, $I_S$ being the intensity of the reproduction signal to be obtained by recording and reproducing under scanning light beams on the position of a centerline within said separate regions, and $I_T$ being the intensity of the reproduction signal to be obtained by recording and reproducing under scanning light beams on the position of a centerline within said recording tracks.

6. The magneto-optical disc of claim 1, wherein said tracking guides are grooves.

* * * * *